United States Patent
Plachta et al.

(10) Patent No.: US 9,533,863 B2
(45) Date of Patent: Jan. 3, 2017

(54) INDUSTRIAL TRUCK

(71) Applicant: Jungheinrich Aktiengesellschaft, Hamburg (DE)

(72) Inventors: Dominik Plachta, Katy, TX (US); Clemens Albrecht, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 14/522,147

(22) Filed: Oct. 23, 2014

(65) Prior Publication Data

US 2016/0115005 A1 Apr. 28, 2016

(51) Int. Cl.
*B66F 9/075* (2006.01)
*B60G 3/04* (2006.01)
*B60G 13/00* (2006.01)

(52) U.S. Cl.
CPC .............. *B66F 9/07586* (2013.01); *B60G 3/04* (2013.01); *B60G 13/005* (2013.01); *B66F 9/07572* (2013.01)

(58) Field of Classification Search
CPC .... B66F 9/07586; B66F 9/07572; B60G 3/08; B60G 3/02; B60G 3/04; B60G 13/005
See application file for complete search history.

(56) References Cited

U.S. PATENT DOCUMENTS

| | | | | | |
|---|---|---|---|---|---|
| 2,030,710 A | * | 2/1936 | Opolo | ................... | B60G 3/04 267/231 |
| 2,242,454 A | * | 5/1941 | Cochran | ............. | B66F 9/07568 16/48 |
| 3,031,024 A | * | 4/1962 | Ulinski | .................... | B62D 7/02 116/31 |
| 3,379,268 A | * | 4/1968 | Enke | ........................ | B60G 3/02 180/360 |
| 3,414,290 A | * | 12/1968 | Wilfert | ..................... | B60G 3/02 280/124.111 |
| 3,424,475 A | * | 1/1969 | Gibson | ............... | B66F 9/07568 180/253 |
| 3,787,064 A | * | 1/1974 | De Priester | ........... | B62B 3/0612 280/124.111 |
| 3,976,302 A | * | 8/1976 | Hammarstrand | ........ | B60G 9/02 180/41 |
| 4,598,784 A | * | 7/1986 | Tronich | .................. | B60G 17/02 180/19.2 |
| 4,750,579 A | * | 6/1988 | Jarl | ..................... | B60G 17/0272 180/209 |
| 4,787,646 A | * | 11/1988 | Kamlukin | ............. | A01D 34/64 280/124.113 |
| 5,685,555 A | * | 11/1997 | McCormick | .......... | B60G 13/04 267/196 |

(Continued)

FOREIGN PATENT DOCUMENTS

DE 10 2006 024 117 A1 11/2007

*Primary Examiner* — Joseph Rocca
*Assistant Examiner* — Maurice Williams
(74) *Attorney, Agent, or Firm* — Walter Ottesen, P.A.

(57) ABSTRACT

An industrial truck has a drive part and a load part. The drive part has at least one steerable drive wheel and at least one supporting wheel. The drive part has a full-floating axle which has two arms which are in each case mounted in a rotational joint and of which one bears the supporting wheel and one bears the drive wheel. Each arm is coupled to the drive part via a spring damping element.

8 Claims, 2 Drawing Sheets

(56) References Cited

U.S. PATENT DOCUMENTS

| | | | | |
|---|---|---|---|---|
| 5,813,697 A * | 9/1998 | Bargenquast | B60G 9/02 | 280/6.154 |
| 5,873,586 A * | 2/1999 | Krimmell | B60G 3/00 | 280/124.113 |
| 6,126,178 A * | 10/2000 | Chino | B60G 13/005 | 280/6.154 |
| 6,131,918 A * | 10/2000 | Chino | B60G 9/02 | 280/124.112 |
| 6,250,660 B1 * | 6/2001 | Woo | B60G 3/04 | 280/124.149 |
| 7,416,188 B2 * | 8/2008 | Segerljung | B60G 21/045 | 280/124.112 |
| 7,510,198 B2 * | 3/2009 | Rach | B60G 9/022 | 280/124.112 |
| 7,861,820 B1 * | 1/2011 | Goodwin | B62D 7/09 | 180/408 |
| 2001/0013692 A1 * | 8/2001 | Murase | B60G 3/00 | 280/124.1 |
| 2001/0052684 A1 * | 12/2001 | Krone | A01D 67/00 | 280/124.112 |
| 2002/0093153 A1 * | 7/2002 | Scotese | B60G 9/02 | 280/6.153 |
| 2003/0070862 A1 * | 4/2003 | Tartara | B66F 9/07568 | 180/411 |
| 2004/0108663 A1 * | 6/2004 | Rickers | B60G 9/02 | 280/6.154 |
| 2005/0156391 A1 * | 7/2005 | Krenzin | B66F 9/07586 | 280/5.515 |
| 2005/0217906 A1 * | 10/2005 | Spark | B60T 8/24 | 180/22 |
| 2006/0090445 A1 * | 5/2006 | McLean | A01B 51/026 | 56/228 |
| 2009/0107774 A1 * | 4/2009 | Hoff | B66F 17/003 | 187/226 |
| 2010/0237578 A1 * | 9/2010 | Hakoda | B60G 9/02 | 280/124.116 |
| 2011/0254241 A1 * | 10/2011 | Piontek | F16F 7/00 | 280/124.1 |
| 2012/0239259 A1 * | 9/2012 | McCabe | B60G 17/016 | 701/50 |
| 2013/0270788 A1 * | 10/2013 | Wood | B60G 5/04 | 280/124.116 |
| 2015/0001007 A1 * | 1/2015 | Keller | B60G 21/05 | 187/222 |
| 2015/0258870 A1 * | 9/2015 | Gollapalli | B60G 11/22 | 280/124.108 |

* cited by examiner

INDUSTRIAL TRUCK

FIELD OF THE INVENTION

The present invention relates to an industrial truck with a drive part and a load part. The drive part has at least one steerable drive wheel and at least one supporting wheel. The supporting wheel is generally configured as a trailing wheel which is aligned in accordance with the direction of travel of the industrial truck. The direction of travel is predetermined by the steerable drive wheel.

BACKGROUND OF THE INVENTION

DE 10 2006 024 117 A1 discloses the mounting of a drive unit for an industrial truck via a spring element. The drive wheel together with the drive unit thereof is fastened in a steerable manner to a vehicle frame. In addition, the drive wheel is mounted at its side, which faces away from the vehicle frame, so as to be pivotable about a vertical axis. An at least slight movement of the drive unit in the vertical direction relative to the vehicle frame can take place via a spring element. In the known solution, a spring suspension of the drive wheel, which spring suspension is in particular also suitable for reach trucks, is obtained without reducing the stability and overturning resistance of the reach truck.

When four-wheel vehicles having rotatably mounted axles with one or more drive motors are used, the lateral stability during cornering is always an important aspect in order to obtain as little rolling as possible. It is also endeavored for such industrial trucks to improve the comfort properties by means of spring suspension and damping at the drive wheel and at the supporting wheel. In particular when only one driven wheel is used, the stability against overturning and the residual load-bearing capacity are an important aspect, in particular in the case of high lift vehicles.

SUMMARY OF THE INVENTION

It is an object of the invention to provide a vehicle with a steered drive wheel and a supporting wheel, which vehicle provides good lateral stability during cornering with a simultaneously high level of riding comfort.

The industrial truck according to the invention has a drive part and a load part. The drive part has at least one steerable drive wheel and at least one supporting wheel. According to a feature of the invention, the drive part has a full-floating axle which has two arms which are in each case mounted in a rotational joint. One of the arms of the full-floating axle bears the supporting wheel while the other arm of the full-floating axle bears the drive wheel. The drive wheel is generally provided with a rotatable drive unit which provides the drive and the steering movement. In the case of the full-floating axle provided according to the invention, each arm is coupled to the drive part via a spring damping element. The full-floating axle provided makes it possible to significantly improve the riding comfort by means of the spring damping element. At the same time, it can be ensured by the full-floating axle arms that there is sufficient pressure on the wheels.

In a preferred embodiment, the arms of the full-floating axle are mounted in a single rotational joint. This mounting results in the two arms of the full-floating axle being deflected about a common rotation axis. Depending on the dimensions and desired operating mode of the industrial truck, the rotational joint may be arranged eccentrically.

In the case of the eccentric arrangement of the rotational joint, the arm supporting the drive wheel is preferably of shorter configuration. By this means, the camber changes, which occur during the deflection of the full-floating axle, for the drive wheel are also kept small.

In a preferred refinement, each of the spring damping elements has a hard stop. The hard stop limits the movement of the arm toward the vehicle frame. When contact with the hard stop is continued, further yielding of the spring damping element is no longer possible. When contact with the hard stop is continued, the wheel, whether the driven wheel or the trailing supporting wheel, can only be deflected downward only in the event of unevenness of the ground, and therefore good pressure for the drive wheel is ensured.

The industrial truck according to the invention is preferably a reach stacker or a reach truck. Both types of vehicle can be provided with a four-wheel chassis, and therefore there is a particularly great technical interest in pressing all of the wheels with sufficient force onto the underlying surface.

In a particularly preferred refinement, at least one of the spring damping elements is configured for a vibrating frequency occurring during the stacking operation. The vibrations, which occur during the stacking operation, in the drive part of the vehicle are particularly readily absorbed by the spring damping element. The spring damping element is excited by the vibrations during the stacking operation and the hysteresis of the spring damping element is designed for the vibrating frequency.

In a preferred refinement, at least one spring damping element is spring-pretensioned, and therefore, for the corresponding wheel, there is always a certain minimum pressure on the underlying surface.

Alternatively or in addition, the spring damping element can have one or more flexible plastics spring elements which have proven particularly successful for damping vibrations in industrial trucks.

Depending on the configuration, provision may be made for the plastics spring elements to be adhesively bonded or screwed in one of the spring damping elements.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
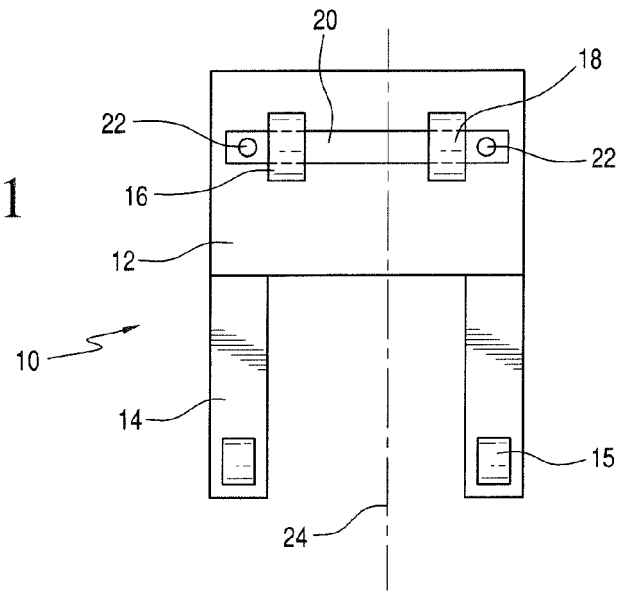
FIG. 1 is a schematic showing an industrial truck in the view from below.

FIG. 1 shows an industrial truck 10 in a schematic view from below. The industrial truck 10 has a drive part 12 and two load forks 14 which are equipped at their free ends with load rollers 15. The drive part 12 has a driven wheel 16 and a trailing supporting roller 18 as supporting wheel. The driven wheel 16 and the supporting roller 18 are held on a full-floating axle 20 which is attached to the drive part and is supported in relation to a vehicle frame (not illustrated) via spring damping elements 22. The full-floating axle 20 has a rotation axis 24 which runs in the longitudinal direction of the vehicle and about which the arms of the full-floating axle 20 can be pivoted.

Figure 2:
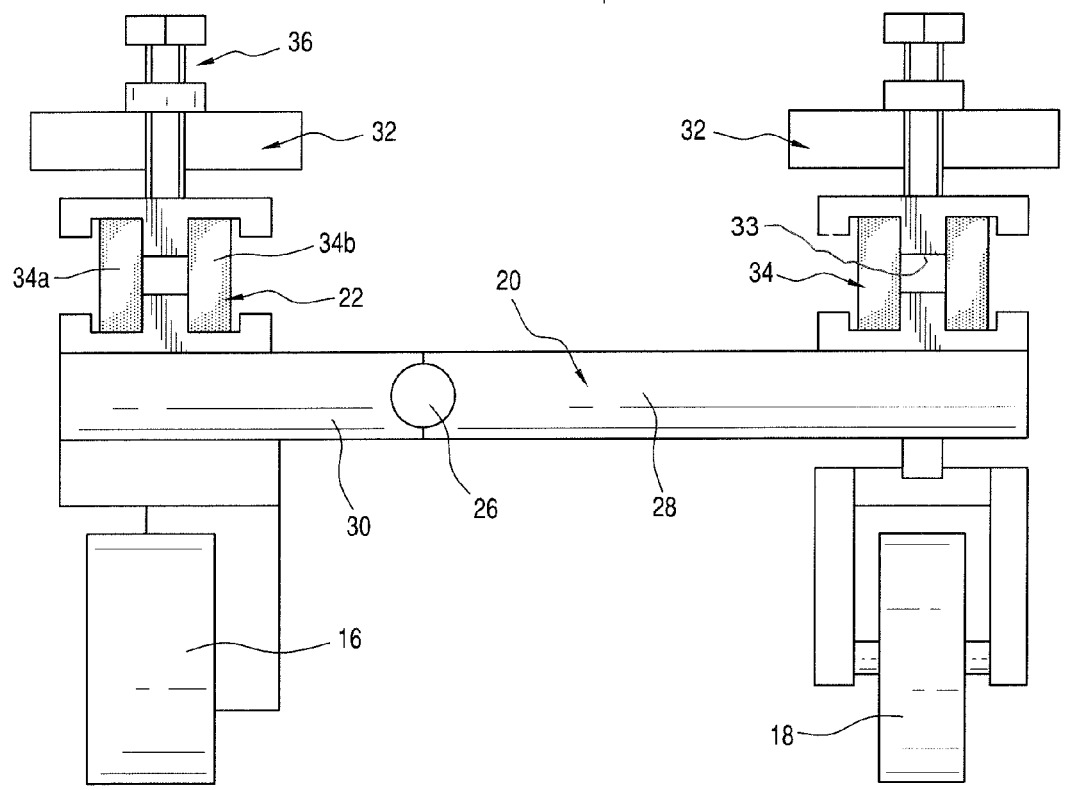
FIG. 2 is a schematic showing a full-floating axle with a drive wheel and supporting wheel in a front view; and, FIGS. 3 to 5 show spring damping elements of different configurations.

FIG. 2 shows the full-floating axle 20 with its rotational joint 26 in a schematic view from the front. The rotational joint 26 divides the full-floating axle 20 into two arms 28 and 30. At the end of the arm 28, the trailing supporting roller 18 is arranged so as to be rotatable about a vertical axis.

The driven wheel 16 is attached to the other arm 30 likewise so as to be rotatable about a vertical axis.

The full-floating axle 20 is spring-mounted on a vehicle frame 32 via the spring damping elements 22. The spring damping elements 22 have two elastomeric damping bodies 34a, 34b. The spring damping element can be fastened to the vehicle frame 32 via adjusting screws 36 with a lock nut.

In the preferred embodiment illustrated in FIG. 2, the arm 30 of the full-floating axle 20 is of shorter design than the arm 28 of the full-floating axle. This results in the changes in the wheel camber of the driven wheel 16 being smaller than in the case of the trailing supporting roller 18 when the axle is deflected.

Also, and according to another feature of the invention, each of the spring damping elements has a hard stop 33. The hard stop 33 limits the movement of the arm toward the vehicle frame 32. When contact with the hard stop 33 is continued, further yielding of the spring damping element is no longer possible. When contact with the hard stop 33 is continued, the wheel, whether the driven wheel or the trailing supporting wheel, can only be deflected downward only in the event of unevenness of the ground, and therefore good pressure for the drive wheel is ensured.

In a preferred refinement, the spring damping element 22 is configured in such a manner that vibrations passing into the vehicle, for example during the stacking and unstacking operations, are damped and absorbed. The spring damping element 22 here can be configured, for example, directly for a lifting mast attached to the vehicle.

Figure 3:
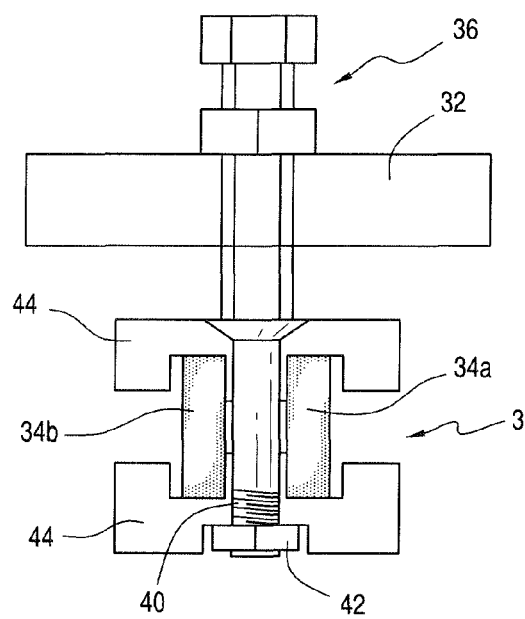

FIG. 3 shows, in a schematic view, a screwed-down spring damping element 38. The spring damping element 38 has two mutually opposite retaining clamps 44, between which the elastomeric damping bodies 34a, 34b are arranged. The retaining clamps 44 are held together via a threaded fastener which runs centrally and has a nut 42. In the screwed-down spring damping unit 38, the elastomeric basic bodies 34a, 34b can be pretensioned by tightening the central threaded fastener 40.

Figure 4:
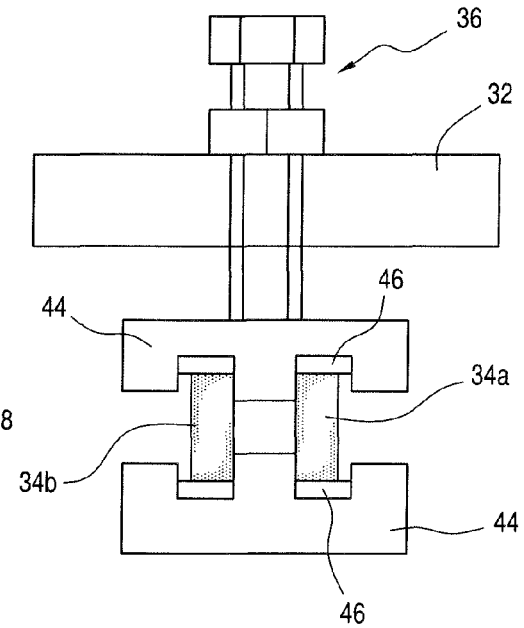

FIG. 4 shows an alternate embodiment wherein the retaining clamps 44 are connected to each other exclusively via the elastomeric damping bodies 34a, 34b. The damping bodies 34a, 34b are adhesively bonded here to the retaining clamps 44 via an adhesive layer 46.

Figure 5:
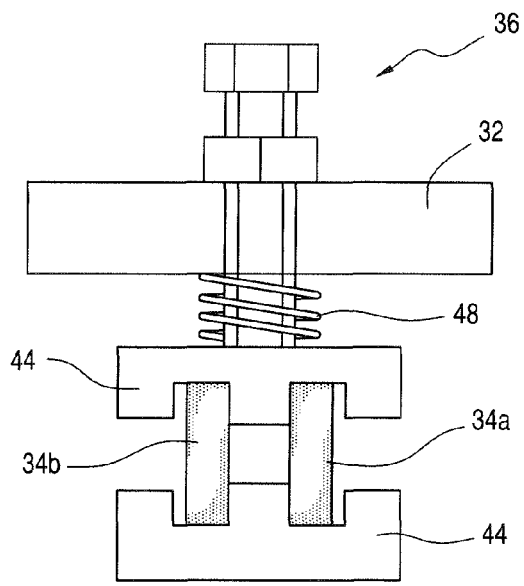

FIG. 5 shows a further development of the embodiment of FIG. 4. A spring 48 is additionally provided between the upper retaining clamp 44 and the vehicle frame 32. The pressure for the corresponding wheel is increased by the spring 48.

The differently configured spring damping elements are provided at defined points of the full-floating axle for the elastic support between vehicle frame and full-floating axle. The axle is rotatable about a defined angle, but at the same time is spring-loaded and damped by the spring damping elements. By this means, the vehicle is stabilized in its entirety when cornering and has a low lateral inclination with its vehicle frame. The drive wheel is dynamically less relieved of load. Impacts are damped by the vertical spring deflection on the side of the drive wheel and of the supporting wheel. The spring and damping travel can be adjusted individually on the drive side and on the trailing side of the full-floating axle by the spring damping elements. The drive wheel load can thereby be increased and the ratio of the spring deflection on the drive wheel side and the trailing wheel side can be adjusted in such a manner that the vehicle is virtually symmetrically stable against overturning.

In addition, kinetic energy, for example starting from the mast of the industrial truck, can be absorbed and dissipatively consumed via the elastic properties of the damping bodies.

It is understood that the foregoing description is that of the preferred embodiments of the invention and that various changes and modifications may be made thereto without departing from the spirit and scope of the invention as defined in the appended claims.

LIST OF REFERENCE NUMBERS 13 industrial truck
12 drive part
14 load forks
15 load rollers
16 driven wheel
18 supporting roller
20 full-floating axle
22 spring damping element
24 rotation axis
26 joint
28 arm of the full-floating axle
30 arm of the full-floating axle
32 vehicle frame
34a damping body
34b damping body
36 adjusting screws
38 spring damping element
40 threaded fastener
42 nut
44 retaining clamp
46 adhesive layer
48 spring

What is claimed is:

1. An industrial truck defining a longitudinal center axis, said industrial truck comprising:
  a drive part having a frame and at least one steerable drive wheel and at least one support wheel;
  said drive part including a full-floating axle;
  said full-floating axle having a first arm and a second arm and having a rotational joint interconnecting and supporting said first and second arms with said first arm being shorter than said second arm;
  said first arm carrying said steerable drive wheel and said second arm carrying said support wheel;
  a first resilient damping element coupling said first arm to said frame of said drive part;
  a second resilient damping element coupling said second arm to said frame of said drive part;
  said single rotational joint being arranged off-center in said full-floating axle with respect to said drive wheel and said support wheel as well as with respect to said longitudinal center axis of said industrial truck; and, each of said first and second resilient damping elements having a hard stop for limiting a movement of the arm corresponding thereto toward said frame.

2. The industrial truck of claim 1, wherein said rotational joint is a single rotational joint of said full-floating axle and said first and second arms are supported in said single rotational joint.

3. The industrial truck of claim 1, wherein said industrial truck is a reach truck or a high rack stacker.

4. The industrial truck of claim 1, wherein at least one of said first and second resilient damping elements is configured for an intrinsic frequency.

5. The industrial truck of claim 1, wherein at least one of said first and second resilient damping elements is resiliently prestressed.

6. The industrial truck of claim 1, wherein at least one of said first and second resilient damping elements has one or more elastic plastic spring elements.

7. The industrial truck of claim 6, wherein said one or more of said elastic plastic spring elements is secured with adhesives.

8. The industrial truck of claim 6, wherein said one or more of said elastic plastic spring elements is secured with a corresponding one or ones of said resilient damping elements by one or more threaded fasteners.

\* \* \* \* \*

UNITED STATES PATENT AND TRADEMARK OFFICE
CERTIFICATE OF CORRECTION

Page 1 of 1

PATENT NO. : 9,533,863 B2
APPLICATION NO. : 14/522147
DATED : January 3, 2017
INVENTOR(S) : D. Plachta et al.

It is certified that error appears in the above-identified patent and that said Letters Patent is hereby corrected as shown below:

In the Specification

In Column 4:
Line 17: delete "13" and insert -- 10 -- therefor.

Signed and Sealed this
Eleventh Day of April, 2017

Michelle K. Lee
*Director of the United States Patent and Trademark Office*